United States Patent [19]

Kobayashi et al.

[11] 4,356,388
[45] Oct. 26, 1982

[54] ODOMETER

[75] Inventors: Yasuyuki Kobayashi; Hisao Nezu; Etsushi Nishikata, all of Nagaoka, Japan

[73] Assignee: Nippon Seiki Kabushiki Kaisha, Niigata, Japan

[21] Appl. No.: 120,990

[22] Filed: Feb. 13, 1980

[30] Foreign Application Priority Data

Feb. 17, 1979 [JP] Japan ............................ 54-19139[U]

[51] Int. Cl.³ ............................................. G01C 22/00
[52] U.S. Cl. ....................................................... 235/96
[58] Field of Search ...................... 235/95 R, 95 C, 96, 235/97, 117 R; 73/490

[56] References Cited

U.S. PATENT DOCUMENTS

| 3,137,444 | 6/1964 | Harada | 235/95 X |
| 3,432,096 | 3/1969 | Powell | 235/96 |
| 3,580,497 | 5/1971 | Powell | 235/96 |
| 3,667,671 | 6/1972 | Hachtel | 235/96 |
| 4,192,450 | 3/1980 | Nezu | 235/96 X |

Primary Examiner—L. T. Hix
Assistant Examiner—Thomas H. Tarcza
Attorney, Agent, or Firm—Burgess, Ryan and Wayne

[57] ABSTRACT

A tamper proof odometer wherein elastic arms are mounted on a driving gear, teeth in the inner circumference of a recess formed in one side of the least significant digit wheel engage with the front end of the elastic arm to prevent reverse rotation, and alternate teeth of a gear of a holder to engage with two protrusions in the inner circumference of the recess formed in the other side of the least significant digit wheel are partially notched for prevention of reverse rotation so that the odometer may be driven and may register mileage in the forward direction of the vehicle only and may not be driven in the other direction.

1 Claim, 7 Drawing Figures

ODOMETER

BACKGROUND OF THE INVENTION

The present invention relates to a counter or a tamper proof odometer which cannot be rotated in the subtractive direction.

There have been devised and demostrated various types of tamper proof odometers. Of these the most common type is such that a drive shaft which rotates in proportion to that of wheels of a vehicle carries a worm gear which is pressed under the force of a spring against a gear made integral with the least significant digit (LSD) wheel of an odometer in such a way that the rotation of the drive shaft may be transmitted to the least significant digit wheel in one or additive direction, but when the drive shaft is rotated in the opposite or subtractive direction, the consequent rotation in the other or subtractive direction of the worm gear causes the decrease in strength of the spring, resulting in the disengagement of the worm gear with the gear of the least significant digit gear. As a result, rotation in the substractive direction of the odometer is prevented.

However, the tamper proof odometers of the type described have to use a worm gear which is long in length, resulting in an increase in size of the odometer. In addition, the spring-actuated clutch for engaging and disengaging the worm gear and the gear carried by the least significant digit wheel is complex in construction.

SUMMARY OF THE INVENTION

One of the objects of the present invention is to provide a tamper proof odometer which is of simple construction, yet very reliable in ensuring unidirectional operation of the digit wheels.

To the above and other ends, the present invention provides a tamper proof odometer wherein a shaft secured to a frame is extended through central holes of a plurality of digit wheels; the front end of an elastic arm mounted on a driving gear engages with teeth formed in the inner circumference of a recess in one side face of the least significant digit wheel; alternate teeth of a pinion gear mounted on one side face of a holder inserted between the least significant digit wheel and the adjacent digit wheel are notched to half their length and formed with vertical notches on the forward face according to the direction of rotation; two protrusions formed in the inner circumference of a recess on the other side face of said least significant digit wheel engage with said pinion gear; when the driving gear is rotated in the forward direction, the protrusions on the latter side face of the least significant digit wheel rotate the pinion gear in accordance with its rotation and, when the least significant digit wheel is rotated in the reverse direction, the protrusions engage with the non-notched teeth of the pinion gear, thus preventing its rotation.

DESCRIPTION OF THE PREFERRED EMBODIMENTS

Figure 1:
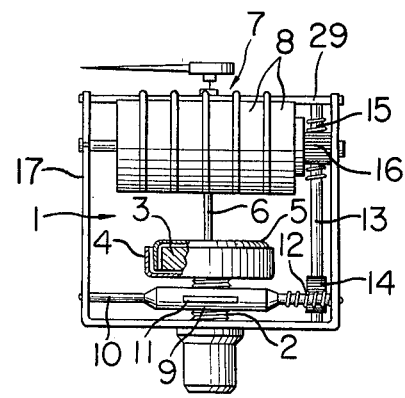
FIG. 1 is a fragmentary, front view of an assembly incorporating an odometer in accordance with the present invention.
Figure 2:
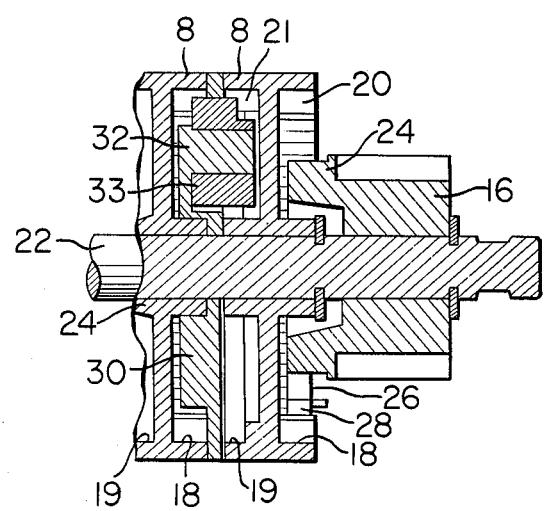
FIG. 2 is a fragmentary, enlarged cross-sectional view of FIG. 1.
Figure 3:
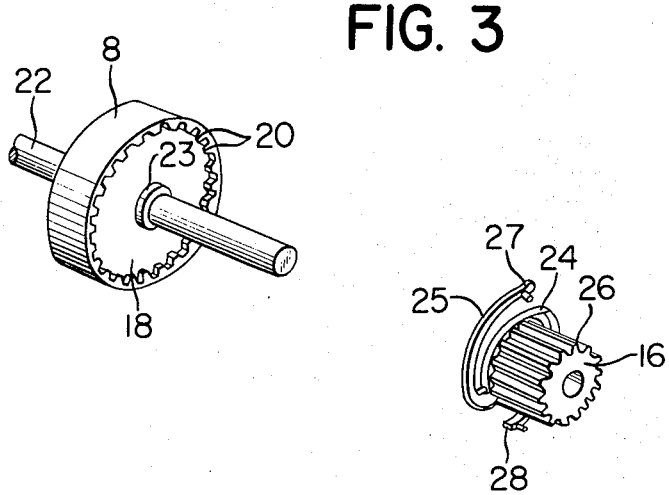
FIG. 3 is a fragmentary, exploded perspective view of FIG. 1.
Figure 4:
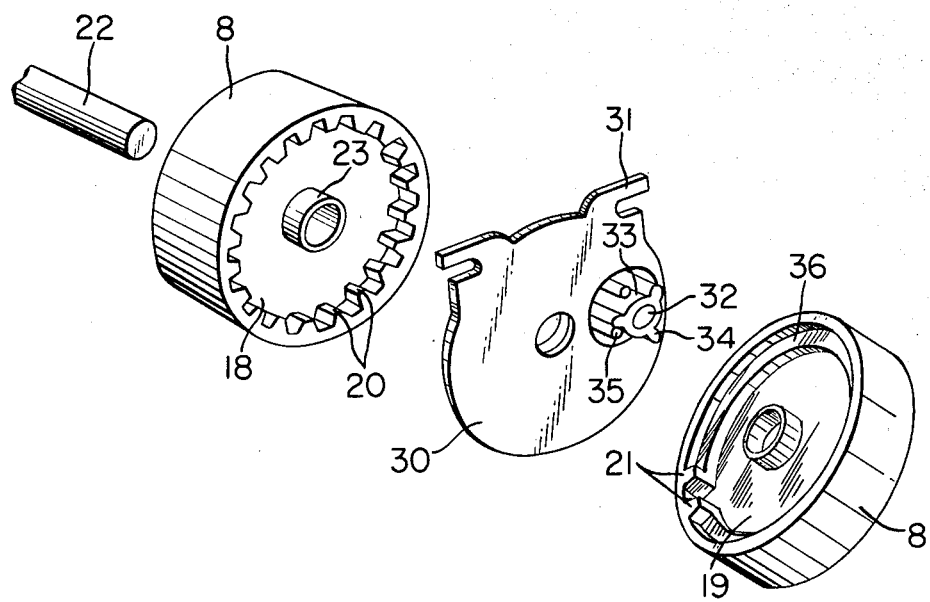
FIG. 4 is a fragmentary, exploded perspective view of FIG. 1.

An embodiment of the present invention will now be described. FIG. 1 shows the main construction of a tamper proof odometer in accordance with the present invention. In FIG. 1, a tachometer 1 of eddy current type is constructed in a conventional manner so that it transmits the rotation of the driving source of a vehicle through a flexible shaft (not shown) to rotate a main shaft 2 for rotating a magnet 3 therewith. The magnetic field generated by the magnet 3 acts on a rotary body 5 by a magnetic circuit including a magnetically conductive body 4; and a sub-shaft 6 cooperates with the magnetic field to produce an action equal to the resilient force of a hair spring (not shown) for converting the rotation into an angular movement to measure the driving speed of the vehicle.

An odometer 7 is constructed in a conventional manner for regulating figures from the least significant digit wheel to the upper digit wheels of a set of digit wheels 8 through an intermediate pinion gear (not shown). A gear 9 formed on the main shaft 2 engages with a gear 11 formed on a cross shaft 10 for transmitting the rotational movement. A gear 12 formed on the cross shaft 10 engages with a gear 14 formed on a longitudinal shaft 13. Both the shafts 10 and 13 are rotatablly supported by a frame 17, and a further gear 15 formed on the longitudinal shaft 13 engages with a driving gear 16 for the least significant digit wheel.

A particular embodiment of the odometer 7 of the present invention is shown in FIGS. 2-5.

Digit wheels 8 are I-shaped in circumferential cross-section so that circular recesses 18 and 19, coaxial with the digit wheels 8, are formed to both sides of a central wall, and teeth 20 and 21 are formed on the inner circumferential walls of these recesses 18 and 19.

The teeth 20 are connected to the lower digit side of each digit wheel 8, and the teeth 21 are positioned as intermittent double teeth at the upper digit side of each digit wheel 8, and they function as will be described hereinafter.

A shaft 22 is securely extended between opposite sides of the frame 17 (FIG. 1) and rotatably supports each digit wheel 8. This shaft is extended through a driving gear 16 engaged with the gear 15 (FIG. 1) of the driving transmission shaft 13. Elastic arms 25 and 26 are formed at the side of the least significant digit wheel 8 at the disk part 24 of the driving gear 16. The front ends 27 and 28 of these arms engage with the teeth 20 on the inner circumferential wall of the recess 18 so that the driving gear 16 and the least significant digit wheel 8 rotate in cooperation. In this embodiment, the elastic arms 25 and 26 extend spirally in the same direction from initial positions 180° apart, these positions being where the central line of the disk portion 24 of the driving gear 16 crosses the outer circumference of the disk portion 24.

A circular holder 30 (FIG. 4) of synthetic resin is interposed between adjacent digit wheels 8 with a shaft 22 extending through the central portions thereof. Lugs 31 which are integral with the holder 30 project from its outer circumference. These lugs 31 engage with a horizontal stop plate 29 (FIG. 1) to hold the holder 30 stationary between the digit wheels 8.

A support shaft 32 is formed integrally with the side face of the holder, and a pinion gear 33 is rotatably supported by the support shaft 32. The pinion gear is positioned between the recess 19 at the upper digit side of the lower digit wheel 8 and the recess 18 at the lower digit side of the adjacent upper digit wheel 8. The pinion gear, on one side, thus continuously engages with the teeth 20 on the circumferential wall of the recess 18 and, on its other side, intermittently engages with the intermittent teeth 21 on the circumferential wall of the adjacent recess 19.

The teeth of the pinion gear 33 corresponding to the intermittent teeth 21 comprise, alternately longer teeth 34 and shorter teeth 35 in the axial circumferential direction of the support shaft 32.

An annular step 36 is formed in the recess 19 with the intermittent teeth 21, the annular step being along the circumference of the digit wheel 8, on the track of a virtual circle formed by the intermittent teeth 21, above the bottom of the recess 19 excluding the area between the teeth 21, and below the teeth 21. One of the shorter teeth 35 rides on this step 36 and two longer teeth 34, at both sides, of the shorter teeth meet the upright circumference of the step 36.

Notches 37 (FIG. 5) are formed on one side of each shorter tooth 35 in the direction of the width of the teeth between the least significant digit wheel 8 and the next digit wheel 8. These notches are formed on the side so that they engage with the end face of one of the intermittent teeth 21 of the digit wheel 8.

The operation of the embodiment will now be described.

When the longitudinal shaft 13 is rotated in the forward direction (clockwise) by the cross shaft 10 from the main shaft 2, the driving gear 16, engaged with the gear 15, rotates about the shaft 22. The ends 27 and 28 of the elastic arms 25 and 26 of the disk portion 24 rotate the least significant digit wheel 8 through the teeth with which they are continuously engaged.

The operation from the state described above will now be explained with reference to FIG. 5.

Figure 5:
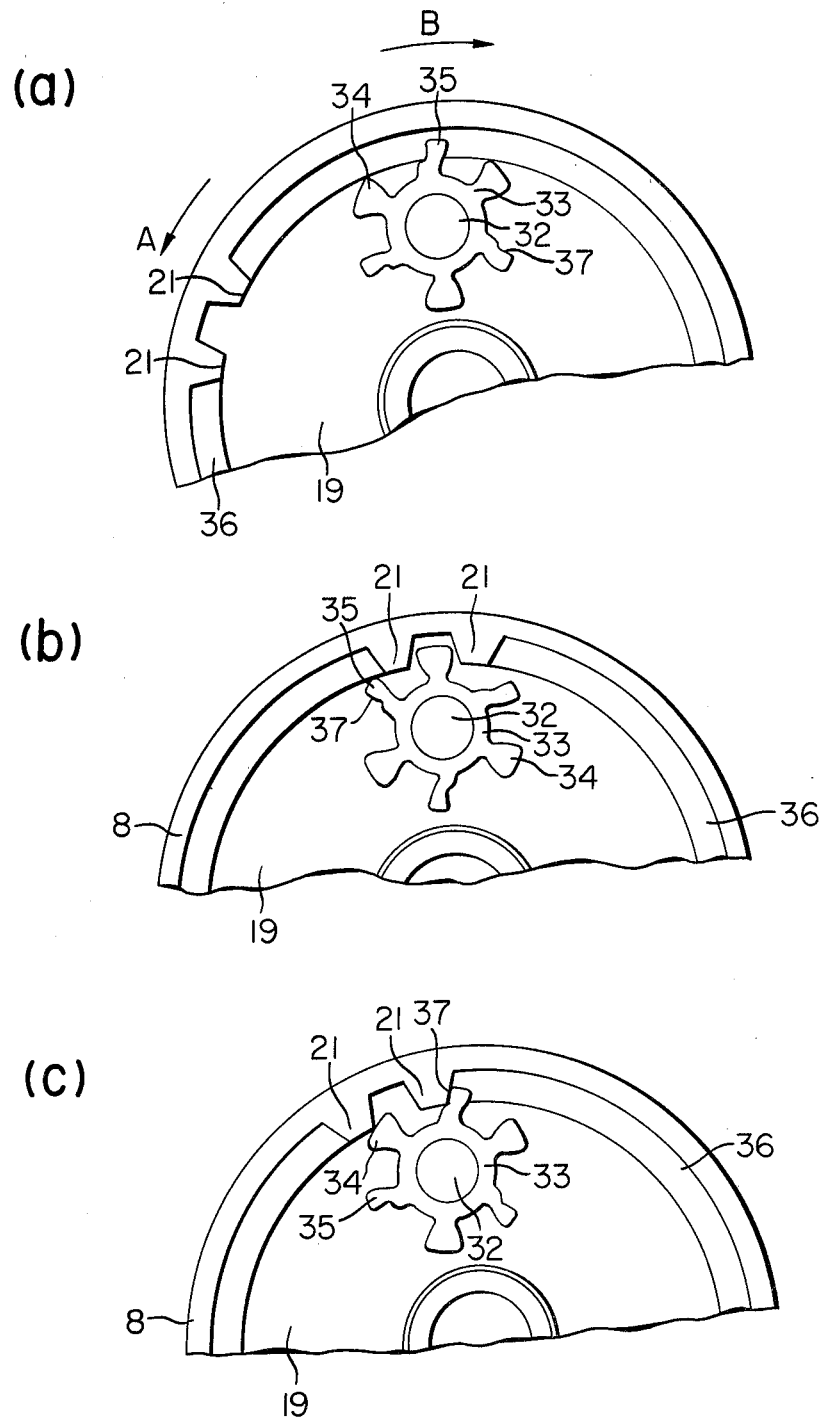
FIGS. 5 (a), (b), and (c) show the operation of the embodiment shown in FIGS. 1-4.

When the least significant digit wheel 8 starts rotating in the direction of the arrow A from the state shown in FIG. 5 (a), a shorter tooth 35 of the pinion gear 33 rides on the annular step 36 of the digit wheel 8, and two longer teeth 34, at both sides of the shorter tooth, meet the upright circumferential wall of the step 35 so that the digit wheel 8 rotates by slipping over the longer teeth 34 and the shorter tooth 35 while the pinion gear 33 is kept unrotatable about the support shaft 32.

As the digit wheel 8 rotates further, the notch 37 of the shorter tooth 35 and its corresponding part meet one of the intermittent teeth 21 and press against it. Then an adjacent longer tooth 34 falls between the teeth 21 and engages therewith, rotating the pinion gear 33.

As the digit wheel 8 rotates still further, the longer tooth 34 and the teeth 21 are disengaged as in FIG. 5 (a), and the pinion gear 33 alone is made immobile.

By repeating this operation, the pinion gear 33 rotates through a predetermined angle upon each rotation of the least significant digit wheel 8. The next digit wheel 8, which takes up digits 'carried over' from the previous wheel, is driven by engagement of the continuous teeth 20 of the next digit wheel 8 with the longer teeth 34 and the shorter tooth 35 of the pinion gear 33. This incrementing is sequentially transmitted to upper digit wheels for displaying the forward mileage of a vehicle.

When the longitudinal shaft 13 is rotated in the reverse direction (counterclockwise), the front ends 27 and 28 of the elastic arms 25 and 26 of the disk portion 24 slip over the continuous teeth 20, and the least significant digit wheel 8 stops rotating irrespective of the rotational movement of the driving gear 16. However, in practice, since the elastic arms 25 and 26 of the disk portion 24 resiliently press the continuous teeth 20 of the least significant digit wheel 8, the least significant digit wheel 8 rotates in the reverse direction as the driving gear 16 is rotated in this reverse direction.

However, even though this digit wheel 8 starts a reverse rotation, an adjacent longer tooth 34 is incapable of engaging with the teeth 21 as one of these intermittent teeth 21, formed in the recess 19 at its upper digit side, will meet a short tooth 35 of the pinion gear 33 within one rotation of the digit wheel 8.

Thus, when the digit wheel 8 is rotated in the reverse direction, the direction of the arrow B in FIG. 5(a), the pinion gear 33 is kept in the same condition as when the digit wheel 8 rotates in the direction of the arrow A. As shown in FIG. 5(c), one of the intermittent teeth 21 meets the shorter tooth 35 of the pinion gear 33 at the notches 37 in the shorter teeth 35. Then the adjacent longer teeth 34 slide over the other intermittent teeth 21 so that they are incapable of being engaged, thereby locking the rotation of the pinion gear 33. As a result, the least significant digit wheel 8 is made immobile, and the elastic arms 25 and 26 of the disk portion 24 of the driving gear 16 act to further inhibit rotation, thus correctly preventing the driven movement of the above-mentioned wheel 8.

Accordingly, when the vehicle is driven in the forward direction, the gear 15 of the longitudinal shaft 13 engages with the front ends 27 and 28 of the elastic arms 25 and 26 of the disk portion 24 of the driving gear 16 for rotating the least significant digit wheel 8. The pinion gear 33 is thus rotated under normal conditions between this digit wheel 8 and the adjacent digit wheel, thus driving the next digit wheel 8 in the incrementing operation, sequentially adding and displaying the mileage of the vehicle. If the flexible shaft is removed from the source of the rotation and a motor is connected to this shaft for giving a reverse rotation, the notches 37 formed on one side of alternate teeth of the pinion gear 33 engage with the intermittent teeth 21 of the least significant digit wheel 8 so that the longer teeth of the pinion gear 33 and the intermittent teeth 21 are unable to engage with each other. Any further rotation of the above-mentioned digit wheel 8 is thus correctly prevented, so that the elastic arms interposed between the driving gear 16 and the above-mentioned digit wheel 8 can advantageously slide, resisting the rotation.

For this purpose, notches 37 are formed on one side of alternate teeth of the pinion gear between the driving gear and the least significant digit wheel 8 in such a manner that they meet the intermittent teeth 21 when the digit wheel 8 is rotated in the revese direction. The present invention thus provides the advantage of a simple construction, and it may be installed with ease.

What is claimed is:

1. A unidirectional odometer, comprising:
    a supporting shaft;
    at least two digit wheels rotationally mounted on said shaft in mutual juxtaposition, each of said wheels being I-shaped in cross-section taken therethrough in the plane of the longitudinal axis of said shaft, with a first circular recess on the least significant digit side thereof and a second circular recess on the most significant digit side thereof;

a driven gear comprising a continuous series of teeth formed on the inner circumference of said first circular recess;

a circular step peripheral to said second circular recess;

a driving gear comprising two adjacent teeth formed on the inner circumference of said second circular recess outside said step and occupying only a minor portion thereof, the remainder of said inner circumference of said second circular recess being untoothed;

a pinion gear holder disposed between said digit wheels;

a pinion gear mounted on said pinion gear holder for rotation about an axis parallel to and spaced apart from said shaft to unidirectionally couple said driving gear to said driven gear;

said pinion gear having a first group of relatively circumferentially short teeth and a second group of relatively circumferentially long teeth interspersed therewith, so that each tooth of one group is surrounded by two teeth of the other group, each of said groups of teeth having a forward face for engaging the teeth of said driving gear to permit rotation of said driving gear, pinion gear and driven gear in a desired forward direction, and an opposite rear face for engaging the teeth of said driving gear upon rotation thereof in the reverse direction, the rear face of each of said relatively circumferentially short teeth having an intermediate shoulder for receiving an adjacent part of the leading edge of one of said two adjacent teeth of said driving gear when said driving gear is rotated in the reverse direction, said shoulder being dimensioned and said pinion gear teeth being dimensioned and spaced so that when said driving gear is rotated in the reverse direction and the leading edge of the leading tooth of said two adjacent teeth of said driving gear engages said shoulder, the leading edge of the other tooth of said driving gear jams against the relatively circumferentially long surface of an adjacent tooth of said pinion gear to prevent rotation thereof in said reverse direction; and means for rotating the least significant digit wheel, including a pair of elastic arms having front ends in engagement with the teeth of the driven gear thereof.

* * * * *